(12) United States Patent
Moreland

(10) Patent No.: US 8,604,695 B2
(45) Date of Patent: Dec. 10, 2013

(54) AUTOMATIC BACKUP LIGHTING SYSTEM

(76) Inventor: Gregory Moreland, Mission Hills, CA (US)

( * ) Notice: Subject to any disclaimer, the term of this patent is extended or adjusted under 35 U.S.C. 154(b) by 152 days.

(21) Appl. No.: 13/242,109

(22) Filed: Sep. 23, 2011

(65) Prior Publication Data

US 2013/0076242 A1   Mar. 28, 2013

(51) Int. Cl.
*H05B 37/00* (2006.01)
(52) U.S. Cl.
USPC .......................................... 315/86; 315/177
(58) Field of Classification Search
USPC ............. 315/85, 86, 119, 177; 307/46, 64, 66
See application file for complete search history.

(56) References Cited

U.S. PATENT DOCUMENTS

| | | | |
|---|---|---|---|
| 3,836,815 A * | 9/1974 | Herzog | 315/86 |
| 4,099,168 A * | 7/1978 | Kedjierski et al. | 340/517 |
| 4,283,657 A * | 8/1981 | Gordon et al. | 315/86 |
| 4,686,424 A * | 8/1987 | Nuckolls et al. | 315/86 |
| 4,890,004 A * | 12/1989 | Beckerman | 307/66 |
| 5,471,114 A * | 11/1995 | Edwards et al. | 315/86 |
| 5,833,350 A | 11/1998 | Moreland | |
| 5,982,098 A * | 11/1999 | Redgate | 315/86 |
| 6,000,807 A | 12/1999 | Moreland | |
| 6,339,296 B1 * | 1/2002 | Goral | 315/86 |
| 6,350,039 B1 | 2/2002 | Lee | |
| 6,805,469 B1 | 10/2004 | Barton | |
| D515,449 S | 2/2006 | Nelson et al. | |
| 7,199,529 B2 | 4/2007 | Vernon-Dier | |
| 7,506,990 B2 | 3/2009 | Glazner | |
| 7,547,131 B2 | 6/2009 | Faunce | |
| 7,850,322 B2 | 12/2010 | Glazner et al. | |
| 2009/0009093 A1 | 1/2009 | Vernondier et al. | |
| 2010/0301751 A1 * | 12/2010 | Chobot et al. | 315/86 |

* cited by examiner

*Primary Examiner* — Tung X Le
(74) *Attorney, Agent, or Firm* — Patent Law & Venture Group; Gene Scott

(57) ABSTRACT

An emergency lighting system induces an AC current in a toroidal coil encircling a non-shielded electrical element of a power circuit. The AC current is rectified to DC and delivered to a rechargeable standby battery. The battery provides a first input to a NAND gate, and a proximity transducer provides a second input to the NAND gate. When the power circuit is energized from the power grid, both inputs to the NAND gate are high and the output is low. When no current is sensed by the transducer one of the input NAND gates is low so that the NAND gate output is high thereby delivering an illumination current to an emergency lighting LED either directly or through a boost amplifier.

6 Claims, 1 Drawing Sheet

Emergency Lighting System

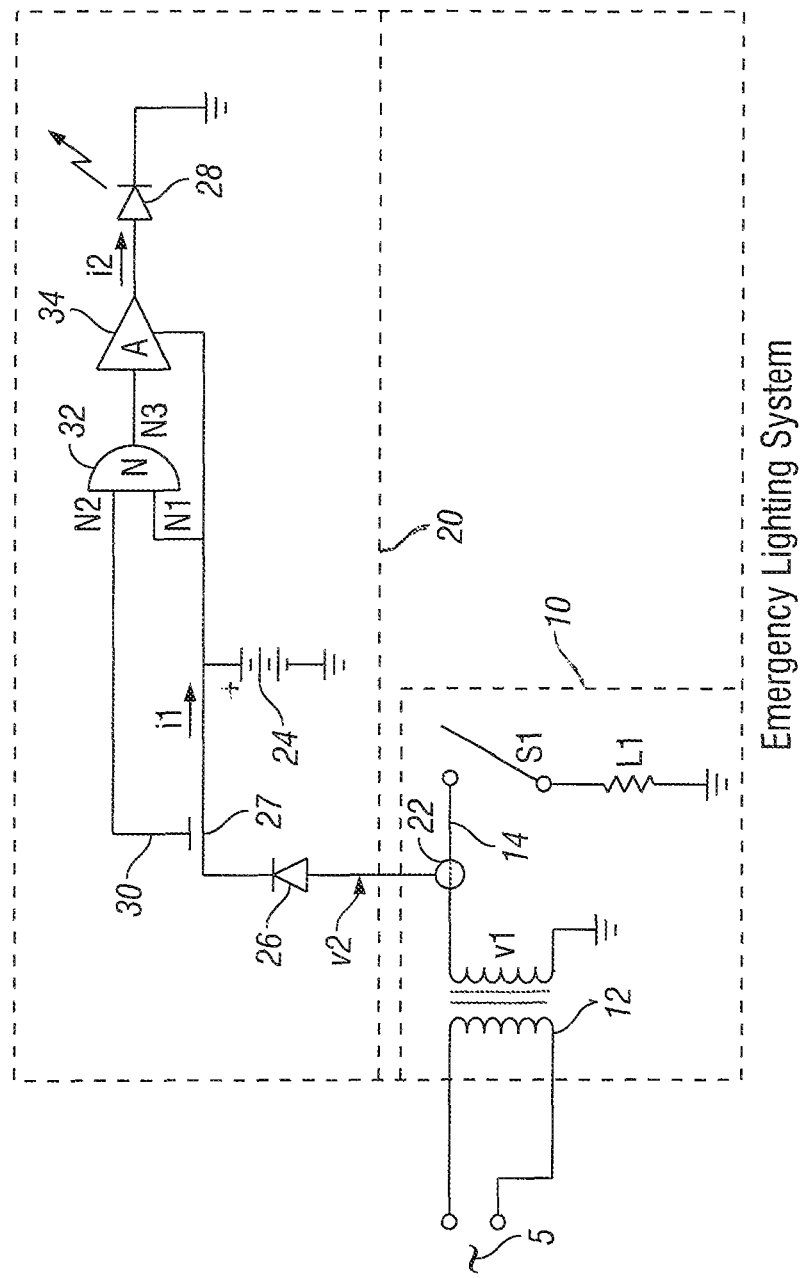

AUTOMATIC BACKUP LIGHTING SYSTEM

BACKGROUND

This disclosure relates to the field of lighting devices and more particularly to lighting devices enabled for providing emergency lighting during utility power failure. Relevant prior art references include; U.S. Pat. No. 6,350,039 entitled Wall Switch and Lamp Assembly, U.S. Pat. No. 7,506,990 entitled Switchplate Area Light, U.S. Pat. No. 7,547,131 entitled Illuminated Electrical Box Cover Plate, U.S. Pat. No. 7,850,322 entitled Switch Plate area Light, U.S. Pat. No. 515,449 entitled Power Failure Switch Warning Light, U.S. Pat. No. 7,199,529 entitled Inductive Lighting System With Back-Up Battery, U.S. Pat. No. 6,805,469 entitled Concealed Safety Lighting Device, U.S. Pat. No. 6,961,005 entitled Electrical Apparatus Comprising a Monitoring Device, Support. and Monitoring Device for Such an Apparatus, and Electrical Installation Incorporating Them, U.S. Pat. No. 6,000,807 and U.S. Pat. No. 5,833,350, both entitled Switch Cover Plate Providing Automatic Emergency Lighting, and US2009/0009093 entitled Switchable Induction Light.

SUMMARY

The present disclosure describes an apparatus and method for providing emergency lighting when utility power fails. The prior art identified above discloses emergency lighting systems which have certain disadvantages such as being expensive to produce and use, complex in their construction, and being difficult to retrofit to existing installations. The presently described and illustrated system overcomes these disadvantages.

In one application, the presently described system is highly useful for converting a standard wall switch so that it may operate as an emergency lighting device. In my prior patent, is U.S. Pat. No. 6,000,807, I have described an illuminated switch plate that may be used to replace a standard switch plate whereby the illuminated switch plate is automatically switched to an on (illuminating) state when power is lost at the switch box. The presently described system provides a new and improved approach to this same capability and additionally is applicable to a wide range of applications other than the wall switch application.

Each electrical fixture that is energized from the power utility grid. is connected using a. three-wire system, a "hot" wire, a common wire, and a ground wire. Whether or not the electrical fixture is drawing current, i.e., turned on, an alternating voltage exists in the hot wire and produces a varying electromagnetic field around the hot wire. In the present apparatus a toroid shaped coil is positioned around this hot wire and is therefore able to produce an output current due to an induced voltage in the coil. This output current, although not robust, is able to maintain charge in a battery in the event utility power fails. The battery receives a direct current from the coil through a rectification circuit and delivers current to one or more LED lamps for emergency illumination. To assure that the battery remains fully charged, the battery current is not directed to the lamps unless utility power fails. To enable this, a NAND gate is used wherein the battery is connected to one of the NAND gate inputs. The other of the NAND gate inputs is connected to a voltage transducer which picks up a voltage level from the direct current conductor that joins the rectification circuit to the battery. As long as the battery is being charged, the utility power is being delivered to the circuit and the LED lamps remain off because both NAND gate inputs are high. When utility power fails, the transducer fails to support its input to the NAND gate and the NAND gate output goes high. This output may be amplified to drive one or more LED lamps. These and other aspects may, in various implementations, provide one or more of the following advantages.

One aspect of the present apparatus is that it comprises relatively few and inexpensive electrical components.

Another aspect of the present apparatus is that it is easily retrofitted to any utility power driven electrical fixture.

Another aspect of the present apparatus is that it provides emergency illumination when utility power fails.

Another aspect of the present apparatus is that it automatically resets when utility power is restored, that is, emergency illumination is turned off.

The details of one or more embodiments of these concepts are set forth in the accompanying drawings and the description below. Other features, objects, and advantages of these concepts will be apparent from the description and drawings, and from the claims.

DESCRIPTION OF DRAWING

FIG. 1 is an electrical schematic diagram illustrating the presently described system.

DETAILED DESCRIPTION

FIG. 1 illustrates an emergency lighting system having a power circuit 10 and a lighting circuit 20. The power circuit 10 has a transformer 12 excited by the utility power grid 5. The transformer 12 normally delivers utility voltage v1 unless the utility grid 5 is not operating. Power circuit 10 has a non-shielded electrical element 14 which may be the utility "hot" wire interconnected with a switch S1 or the like, as for instance for energizing load L1. When v1 is present, whether switch S1 is closed or not, that is, whether current is flowing in the power circuit 10 or not, element 14 is surrounded by a varying electromagnetic field capable of being sensed by a nearby coil.

FIG. 1 also shows that, in this embodiment, the emergency lighting system includes lighting circuit 20 with electrical components interconnected for achieving the objectives stated above. The components include: a toroid-shaped coil 22, a rechargeable battery 24, a rectification circuit 26, a light emitting diode (LED) 28, a proximity transducer 30, and a NAND logic gate 32. A boost current amplifier 34 may also be included in the lighting circuit 20.

The coil 22 may have windings encircling the electrical element 14 of the power circuit 10 thereby producing an induced voltage v2 in the lighting circuit 20 when the utility voltage v1 is present in electrical element 14, and thereby also producing a charging current i1 through the rectification circuit 26 delivering charge to battery 24. Battery 24 is connected to a first input N1 of NAND gate 32 turning the first input N1 to the ON state. Proximity transducer 30 is positioned for sensing the charging current i1 and is connected to a second input N2 of NAND gate 32 turning second input N2 to the ON state. The output N3 of NAND gate 32 is interconnected with LED 28 for driving illumination current i2 to light-up LED 28. When the second input N2 is absent (low), AND gate output N3 is also absent and LED 28 is not illuminated. The output current of the NAND gate 32 may require boosting by boost current amplifier 34 in order to illuminate LED 28 especially when LED 28 represents more than one unit or a heavier current than is available from NAND gate 32.

In a further embodiment of the present apparatus, the power circuit 10 is ancillary to the lighting circuit 20 which, nonetheless achieves the above described objectives.

In a still further embodiment of the present disclosure, a method is described for providing emergency lighting using the circuits described above. This method includes encircling the non-shielded electrical element 14 of the power circuit 10 with windings of the toroidal coil 22 thereby producing the induced voltage v2 and its related charging current i1 from the rectification circuit 26 battery 24. Battery 24 is connected with NAND gate 32 for producing a first input to the NAND gate 32. The proximity transducer 30 is positioned adjacent to the conductor 27 and connected as second input N2 at NAND gate 32. From FIG. 1 we see that when the NAND gate 32 receives the two inputs N1 and N2 no output current is produced and LED 28 remains non-illuminated, but when the second input N2 of the NAND gate 32 is absent due to an absence of i1, output current i2 is developed at N3 and is delivered to LED 28 enabling emergency illumination. The further step of boosting the output at N3 may be taken when LED load calls for it.

The emergency lighting system and its method described herein may be employed as described in my prior patent U.S. Pat. No. 6,000,807, which is hereby incorporated herein by reference in its entirety.

embodiment of the presently claimed apparatus have been described. Nevertheless, it will be understood that various modifications may be made without departing from the spirit and scope of this disclosure. Accordingly, other embodiments are within the scope of the following claims.

What is claimed is:

1. An emergency lighting system comprising:
   a power circuit carrying a utility voltage when a utility power grid is live, wherein a non-shielded electrical element of the power circuit produces an electromagnetic proximity field;
   a lighting circuit having electrical components including: a toroid-shaped coil, a battery, a rectification circuit, a light emitting diode (LED), a proximity transducer, and a not-and (NAND) logic gate;
   said coil having windings encircling the electrical element of the power circuit thereby producing an induced voltage in the lighting circuit when the utility voltage is present in the electrical element, and producing a charging current through the rectification circuit into the battery, the battery providing a first voltage level at a first input of the NAND gate; and
   the proximity transducer positioned for sensing the charging current and producing a second voltage level at a second input of the NAND gate;
   an output of the NAND gate interconnected with the LED for providing an illumination current thereto when the second voltage level at the NAND gate is absent.

2. The emergency lighting system of claim 1 further comprising a current amplifier interconnected with the NAND gate for boosting the illumination current.

3. An emergency lighting circuit comprising:
   electrical components including: a toroid-shaped coil, a battery, a rectification circuit, a light emitting diode (LED), a proximity transducer, and a NAND logic gate;
   said coil having windings encircling an electrical element of a power circuit thereby producing an induced alternating voltage in the lighting circuit when an alternating utility voltage is present in the electrical element, and producing a charging current through the rectification circuit into the battery, the battery providing a first voltage level at a first input of the NAND gate; and
   the proximity transducer positioned for sensing the charging current and producing a second voltage level at a second input of the NAND gate;
   an output of the NAND gate interconnected with the LED for providing an illumination current thereto when the second voltage level at the NAND gate is absent.

4. The emergency lighting circuit of claim 3 further comprising a current amplifier interconnected with the NAND gate for boosting the illumination current.

5. A method of providing emergency lighting using an electrical system having electrical components including: a toroid-shaped coil, a battery, a rectification circuit, a light emitting diode (LED), a proximity transducer, and a NAND logic gate; the method comprising:
   encircling a non-shielded electrical element of a power circuit with windings of the toroidal coil for producing an induced alternating voltage and a related current in the rectification circuit, and a charging current in a conductor engaged with the battery; and
   connecting the battery for producing a first voltage level at a first input of the NAND gate;
   positioning the proximity transducer adjacent to the conductor for producing a second voltage level at a second input of the NAND gate;
   wherein, when the NAND gate receives the two input voltages no output current is produced and the LED is not illuminated, and when the second voltage level at the second input of the NAND gate is absent due to an absence of the induced alternating voltage, an output current is delivered to the LED enabling illumination thereof.

6. The method of claim 5 further comprising boosting the output current from the NAND gate using a current amplifier.

* * * * *